United States Patent [19]
Sim

[11] Patent Number: 5,926,340
[45] Date of Patent: Jul. 20, 1999

[54] METHOD OF COMPENSATING FOR NON-LINEAR TORQUE CHARACTERISTICS OF A VOICE COIL MOTOR IN A COMPUTER HARD DISK DRIVE

[75] Inventor: Dong-Goo Sim, Ahnyang, Rep. of Korea

[73] Assignee: SamSung Electronics Co., Ltd., Suwon, Rep. of Korea

[21] Appl. No.: 08/897,251

[22] Filed: Jul. 18, 1997

[30] Foreign Application Priority Data

Jul. 18, 1996 [KR] Rep. of Korea .................. 96-29029

[51] Int. Cl.[6] .................................................. G11B 5/596
[52] U.S. Cl. ..................................... 360/78.09; 360/77.04
[58] Field of Search .......................... 360/78.09, 78.11, 360/78.12, 78.13, 78.04, 77.04, 77.03, 77.02, 77.01, 75; 369/44.27, 44.28, 44.29, 44.32, 44.34, 44.35, 44.36

[56] References Cited

U.S. PATENT DOCUMENTS

| | | |
|---|---|---|
| 4,908,816 | 3/1990 | Champagne et al. . |
| 5,005,095 | 4/1991 | Wagner . |
| 5,122,702 | 6/1992 | Nakazato . |
| 5,132,855 | 7/1992 | Waugh et al. . |
| 5,182,685 | 1/1993 | Krause et al. . |
| 5,260,618 | 11/1993 | Dunfield et al. . |
| 5,305,160 | 4/1994 | Funches et al. . |
| 5,319,509 | 6/1994 | Michelson et al. .................. 360/77.03 |
| 5,369,345 | 11/1994 | Phan et al. ....................... 360/77.04 X |
| 5,476,015 | 12/1995 | Valent . |
| 5,616,869 | 4/1997 | Valent . |

*Primary Examiner*—Muhammad N. Edun
*Attorney, Agent, or Firm*—Robert E. Bushnell, Esq.

[57] ABSTRACT

A method of compensating for non-linear torque characteristics of an actuator servo control system in a hard disk drive. The method includes initializing all variables in a memory, which are necessary to operate the actuator servo control system, when power is turned on; unlatching a transducer head which is located in a parking zone; measuring voice coil motor torque constants of each track area of a disk, starting from an inner track area to an outer track area, calculating gains of the actuator servo control system using the voice coil motor torque constants and storing the gains of the actuator servo control system in the memory; and compensating for non-linear torque characteristics of the actuator servo control system, based on the gains of the actuator servo control system of each track area of the disk which are stored in the memory, when the transducer head shifts from track to track, during a track seek mode, to perform one of a read operation and a write operation.

7 Claims, 6 Drawing Sheets

METHOD OF COMPENSATING FOR NON-LINEAR TORQUE CHARACTERISTICS OF A VOICE COIL MOTOR IN A COMPUTER HARD DISK DRIVE

This application makes reference to, incorporates the same herein, and claims all benefits accruing under 35 U.S.C. §119 from an application for METHOD OF COMPENSATING FOR NON-LINEAR TORQUE CHARACTERISTIC OF A VOICE COIL MOTOR OF A COMPUTER HARD DISK DRIVE earlier filed in the Korean Industrial Property Office on the 18$^{th}$ of July 1996, and there duly assigned Ser. No. 96-29029, a copy of which application is annexed hereto.

BACKGROUND OF THE INVENTION

1. Technical Field

The present invention relates to a hard disk drive for magnetic storage of digital information and, more particularly, relates to a method of compensating for non-linear torque characteristics of a voice coil motor in order to reduce access time to a particular track of a magnetic disk and to reliably read and write data to and from the same particular track of magnetic disk.

2. Related Art

Computers often include auxiliary memory storage units having media on which data can be written and from which data can be read for later use. Hard disk drives incorporating stacked, commonly rotated rigid magnetic disks are used for storage of data in magnetic form on the disk surfaces. Such hard disk drives typically include a motor drive spindle and associated mechanism for receiving and rotating a disk at a predetermined constant speed, a servo control mechanism for radially positioning a read/write transducer head in response to track position commands, and electronic circuitry for operating the motor to provide data to and read data from the disk. Some disk drives are designed with only one read/write transducer head while others are designed with a plurality of transducer heads for enabling data to be written onto and read from a plurality of corresponding disks.

High performance disk drive systems commonly employ a moving coil actuator (e.g., voice coil motor) for positioning the transducer heads. Coarse positioning, which involves moving the transducer head from one data track to another during a seek mode, is accomplished by controlling the actuator and transducer head in a velocity feedback loop. After a coarse position move is executed, the feedback loop settles the transducer on the selected data track and continues following the data track during a track following mode for normal read/write operations. An important parameter in the track seek operations is the torque of the moving coil actuator. Ideally, the torque of a moving coil actuator is constant with position. The linearity of torque curve is important because it influences the access time of the disk drive. Any variation of the torque with angular position can lead to a longer seek operation and instability problems during track following operation. Contemporary voice coil motor designs with a uniform torque constant are disclosed, for example, in U.S. Pat. No. 4,908,816 for Voice Coil Motor With Linearized Force Constant issued to Champagne et al., U.S. Pat. No. 5,005,095 for Actuator For Linearizing Torque In A Disk Drive System issued to Wagner, U.S. Pat. No. 5,122,702 for Rotary Voice Coil Motor With A Flat Coil issued to Nakamoto, and U.S. Pat. No. 5,260,618 for Space Optimization Voice Coil Motor For Disk Drives issued to Dunfield et al.

Generally, servo control system calculates gain for moving a transducer head to a selected data track during a seek mode using a linearized torque constant. However, the real torque constants at the inner and outer tracks of the disk are comparatively smaller than those at the center track due to a rotation angle. This difference is caused from various external factors such as an unequal density of the magnetic field formed by permanent magnets, unstable bias-force caused by a spindle motor or a flexible printed circuit (FPC) cable, and friction of the actuator bearings. Consequently, track seek and track following operations become unstable at locations where the torque constant is much different from that of the center tracks. This instability causes increased vibration which decreases the performance and reliability of high performance disk drive.

Recent efforts to compensate for actuator torque non-linearity can be found, for example, in U.S. Pat. No. 5,182,685 for Stepper Motor Torque Variance Compensation Using Varied Applied Voltage issued to Krause et al., U.S. Pat. No. 5,305,160 for Compensating For Variations In Torque Capability Of Voice Coil Motors issued to Funches, U.S. Pat. No. 5,476,015 for Non-Linearity Compensation For Hard Disk Drives issued to Valent, and U.S. Pat. No. 5,616,869 issued to Actuator Torque Non-Linearity Compensation For Hard Disk Drive issued to Valent. In Valent '015 and '869, for example, the irregularity of the torque constant of a voice coil motor VCM is compensated using a torque constant multiplier table containing different values for different positions of a disk drive. While these efforts contain their own merits, I have observed that they are overly complex. Accordingly, a simpler and yet effective technique for compensating for non-linear torque characteristics of a voice coil motor VCM can still be contemplated.

SUMMARY OF THE INVENTION

It is therefore an object of the present invention to provide a hard disk drive capable of compensating for non-linear torque of a voice coil motor.

It is also an object to provide a method of recording torque constants measured throughout the range of movement of the actuator during initializing of a hard disk drive and equalizing the torque constants, which are different according to the areas of a disk in an actual operation.

These and other objects of the present invention can be achieved by a method of compensating for non-linear gain characteristics of an actuator servo control system in a disk drive is using torque constants which includes the steps of: initializing all variables in a memory, which are necessary to operate the actuator servo control system, when power is turned on; unlatching a transducer head which is located in a parking zone; measuring voice coil motor torque constants of each track area of a disk, starting from an inner track area to an outer track area, calculating gains of the actuator servo control system using the voice coil motor torque constants and storing the gains of the actuator servo control system in the memory; and compensating for non-linear torque characteristics of the actuator servo control system, based on the gains of the actuator servo control system of each track area of the disk which are stored in the memory, when the transducer head shifts from track to track during a track seek mode to perform one of a read operation and a write operation.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
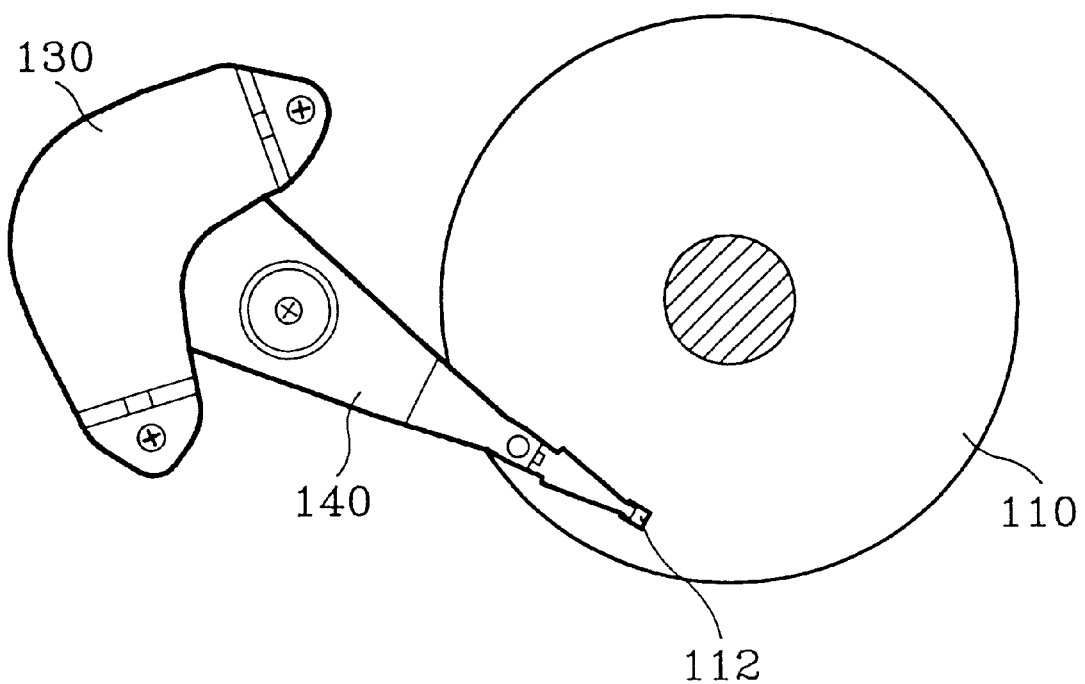
FIG. 1 illustrates a contemporary hard disk drive.

Referring now to the drawings and particularly to FIG. 1, which illustrates a contemporary hard disk drive as used, for example, in computer systems. The disk drive includes a rotating disk 110 for storing data arranged in a succession of circular data tracks, a voice coil motor VCM 130 for rotating an actuator 140 across the surface of the rotating disk 110. The actuator 140 has a transducer head 112 mounted at a distal end for reading/recording data on the disk 110. VCM 130 is composed of a permanent magnet which creates a magnetic field, a yoke-plate which is affected by the magnetic field, and an electric wound coil for modifying the magnetic field so as to move actuator 140. The torque constant of the VCM is obtained through the following formula.

[FORMULA 1]

$$Tc = Bg * Le * R * Nc$$

In FORMULA 1, Tc represents a torque constant of VCM, Bg represents a magnetic flux density, Le represents a useful length per turn of a coil, R is a length of a torque-arm, and Nc is a number of turns of the wound coil.

Figure 6:
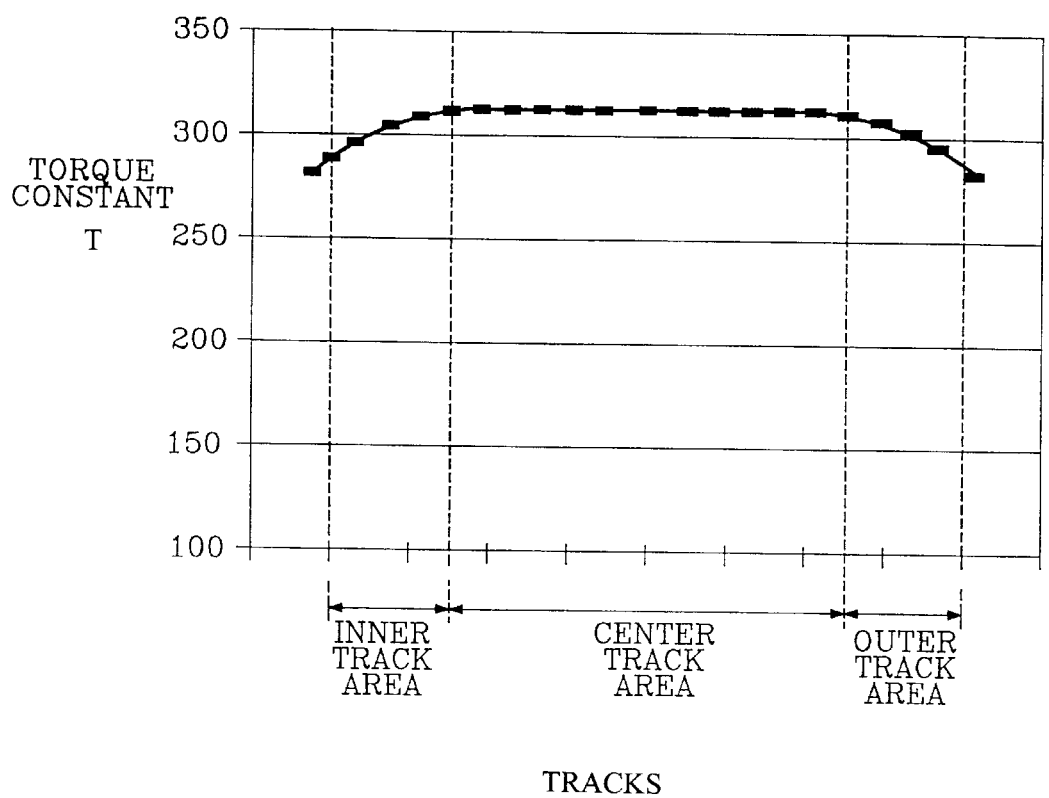
FIG. 6 is an example of how VCM torque constants are changed according to a transducer head's location on the disk in the contemporary hard disk drive.

Servo control system calculates the gain of a system block, using a torque constant. The gain calculated is used during a track seek mode. The torque constants of the VCM used in the servo control system, should be linear. However, as shown in FIG. 6, the real torque constants at the inner and outer tracks of the disk are comparatively smaller than those at the center due to a rotation angle, so that differences between the torque constants are 5 to 10%. This difference results from various external factors such as an unequal density of the magnetic field formed by the permanent magnet, unstable bias-force caused by a spindle motor or a flexible printed circuit (FPC) cable, and friction of the actuator bearings. Therefore, the track seeking and tracking becomes unstable at locations where the torque constant is much different from that of the center tracks. This instability causes an increase in vibration which decreases the performance and reliability of high performance disk drive.

Figure 2:
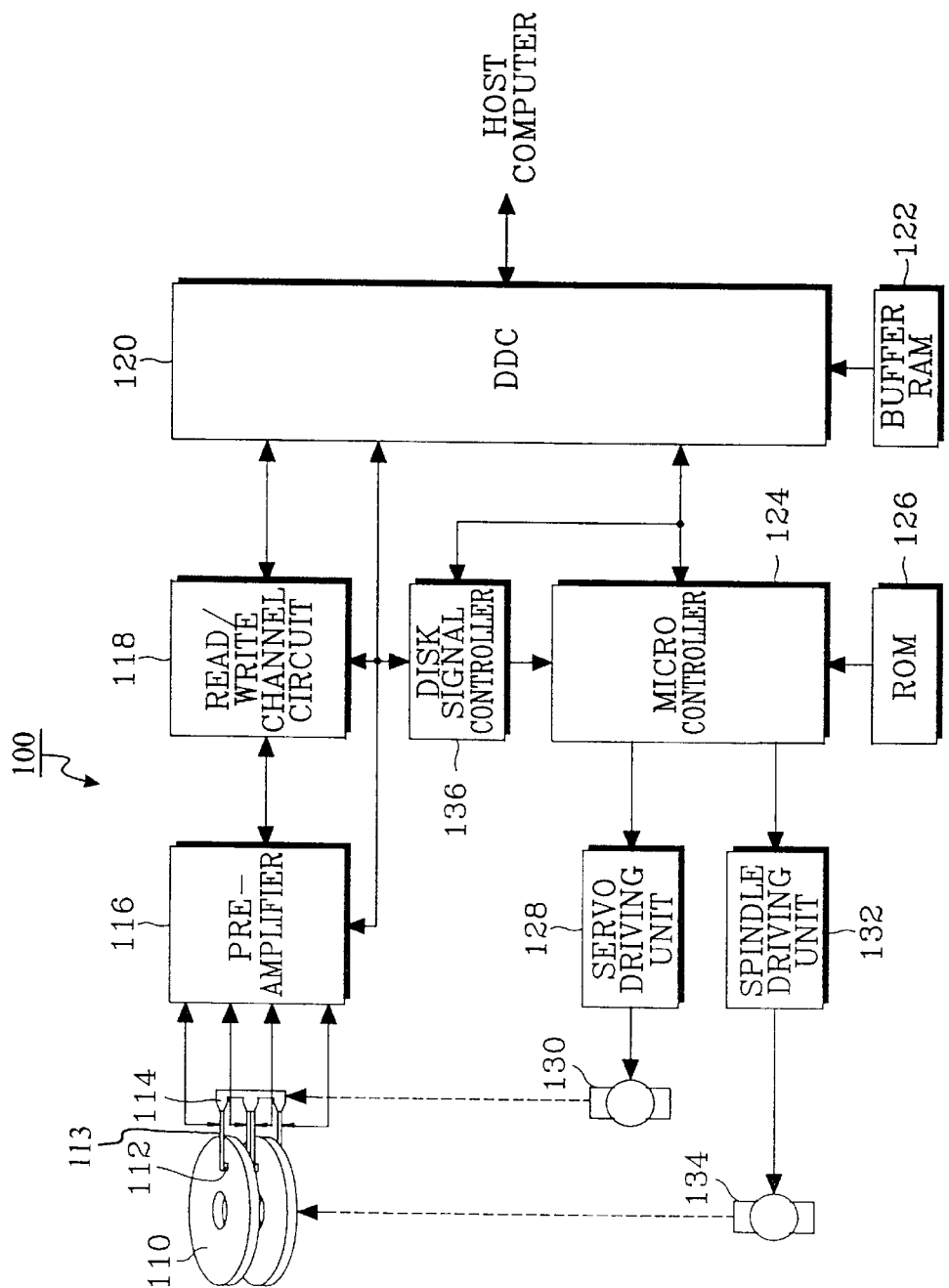
FIG. 2 illustrates a system configuration of a hard disk drive constructed according to the principles of the present invention.

Turning now to FIG. 2, which illustrates a system configuration of a hard disk drive constructed according to the principles of the present invention. As shown in FIG. 2, the hard disk drive 100 includes magnetic disks 110, a transducer head assembly 114 of an E-shape having actuator arms 113 each for supporting a respective transducer head 112, a preamplifier 116, a read/write channel circuit 118, a disk data controller (DDC) 120, a buffer random-access-memory (RAM) 122, a micro-controller 124, a read-only-memory (ROM) 126, a servo driving unit 128 for driving a voice coil actuator 130, a spindle driving unit 132 for driving a spindle motor 134.

Preamplifier 116 is electrically connected to transducer head assembly 114 for amplifying a predetermined signal read out from the disk 110 using the transducer head 112 and transmitting the amplified signal to the read/write channel circuit 118. For the purpose of writing data onto the disk 110, the preamplifier 116 applies encoded writing data transmitted from the read/write channel circuit 118 to a designated transducer head 112 from all available transducer heads to be recorded on the disk 110. At this time, the preamplifier 116 selects one of the transducer heads 112 according to a control signal generated from a disk data controller (DDC) 120 under the instruction of micro-controller 124.

Read/write channel circuit 118 is connected between the preamplifier 116 and the DDC 120 for decoding data pulses from a read signal received from pre-amplifier 116 to generate read-out data, and for decoding write data received from DDC 120 to transmit the decoded write data to the preamplifier 116. DDC 120 which is interfaced between a host computer and micro-controller 124 writes data received from the host computer on a disk 110 through the read/write channel circuit 118 and pre-amplifier 116, or reads data from the disk and transmits the same to the host computer under control of the micro-controller 124. A buffer RAM 122 temporarily stores data transmitted between the host computer, micro-controller 124, and read/write channel circuit 118. Micro-controller 124 controls DDC 120 in response to read or write commands received from the host computer, and controls track seeking and following operations. ROM 126 stores the system control program used by micro-controller 124 and various set points. According to a signal which is generated by micro-controller 124 for controlling the position of head 112, servo driving unit 128 generates current for moving the actuator and applies the current to VCM motor 130. VCM motor 130 moves head 112 attached to the actuator over disk 110 corresponding to the direction and level of the current applied by the servo driving unit 128. A spindle motor driving unit 132 operates a spindle motor 134 which rotates disk 110 according to a value generated by micro-controller 124 for controlling the rotation of the disk 110. A disk signal control unit 136 generates various kinds of timing signals necessary to read and write and sends servo information to the micro-controller 124 after decoding the information.

Referring to FIGS. 2 to 5, a method of compensating for non-linear torque characteristics of voice coil actuator according to the principles of the present invention will now be described in detail hereinbelow.

Figure 3:
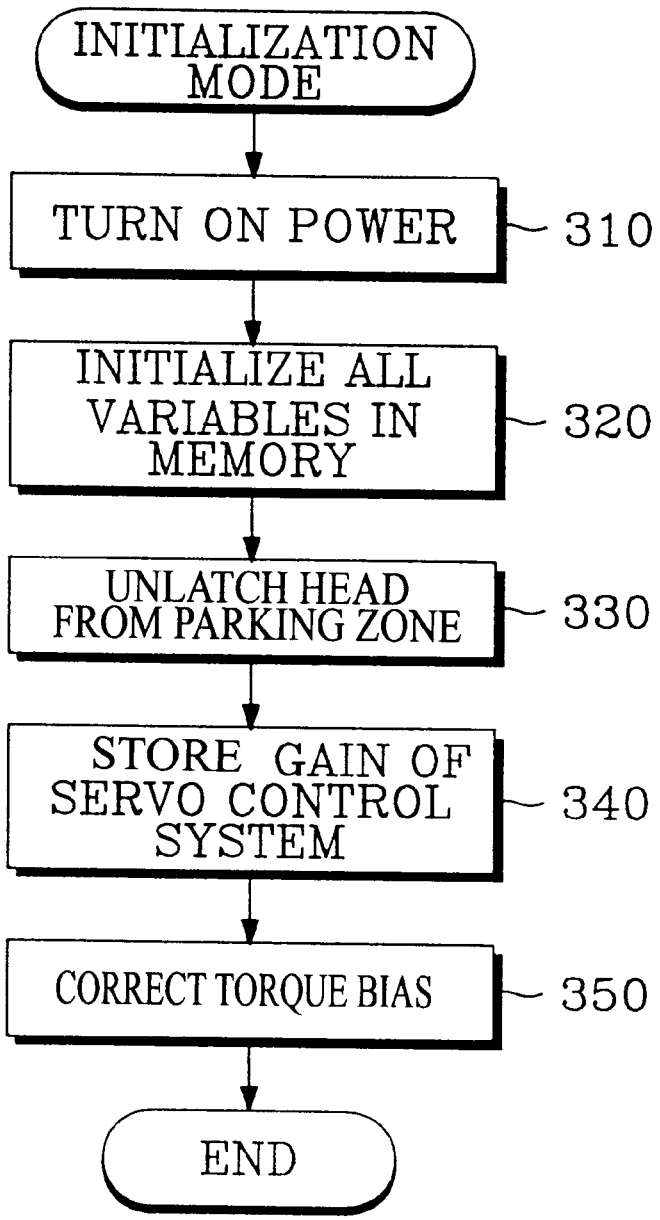
FIG. 3 is a flow chart of an initialization routine according to the principles of the present invention.

As shown in FIG. 3, when power of the hard disk is first turned on at step 310, the micro-controller 124 begins operation in an initialization mode. After the power is turned on at step 310, micro-controller 124 initializes all variables in memory at step 320. Next, micro-controller 124 unlatches head 112 located in a parking zone at step 330. Micro-controller 124 instructs head 112 to seek tracks, starting from an inner track area, to measure the VCM torque. Then the micro-controller 124 calculates the gains of the servo control system at each track area, based on the quantity of VCM torque measured, and then stores the results at step 340. Torque gain biases for the tracks are sequentially measured and corrected after being stored in a bias table at step 350.

An operation of calculating and storing the gain of the servo control system is now explained with reference to FIG. 4 as follows.

Figure 4:
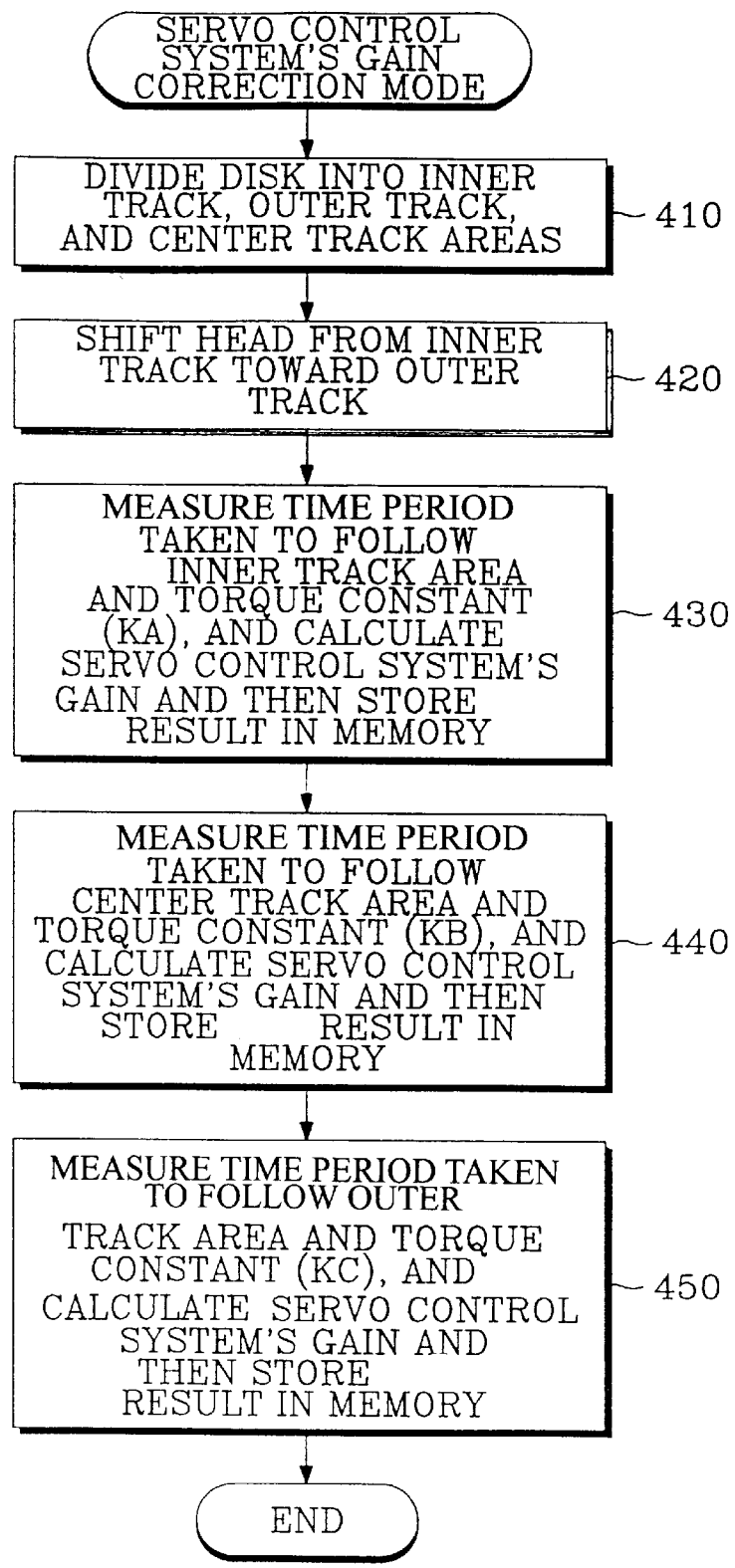
FIG. 4 is a flow chart of calculating and storing gain of a servo control system according to the principles of the present invention.

As shown in FIG. 4, the disk 110 is divided into three different areas including an inner track area, an outer track area, and a center track area at step 410. Micro-controller 124 shifts the unlatched head 112 from an inner track to an outer track at step 420. Micro-controller 124 detects the number of servo areas at each relevant track area when the head 112 shifts from one area to the other in order to measure the shifting time period taken to follow the tracks of each of the inner track area, the center track area and the outertrack area. Micro-controller 124 then calculates the gains for the servo control system, based on the torque constants $K_A$, $K_B$, and $K_C$ calculated using formula 2, and stores the results in ROM 126 at steps 430, 440, and 450. After the servo control system's gain results are stored in memory ROM 126, the program for calculating and storing the gains terminates.

$$K(A, B, C) = \frac{2 \times J \times \theta}{I \times T^2} \qquad \text{[FORMULA 2]}$$

where K(A, B, C) represents the torque constant of the three track areas, namely the inner is track area, the center track area, and the outer track area. "J" represent the moment of inertia of an actuator, "θ" represents a search distance or angle moved by the actuator, "I" represents an electrical current flowing through the coil, and "T" represents the period of time for following one of the inner, center and outer track areas.

Figure 5:
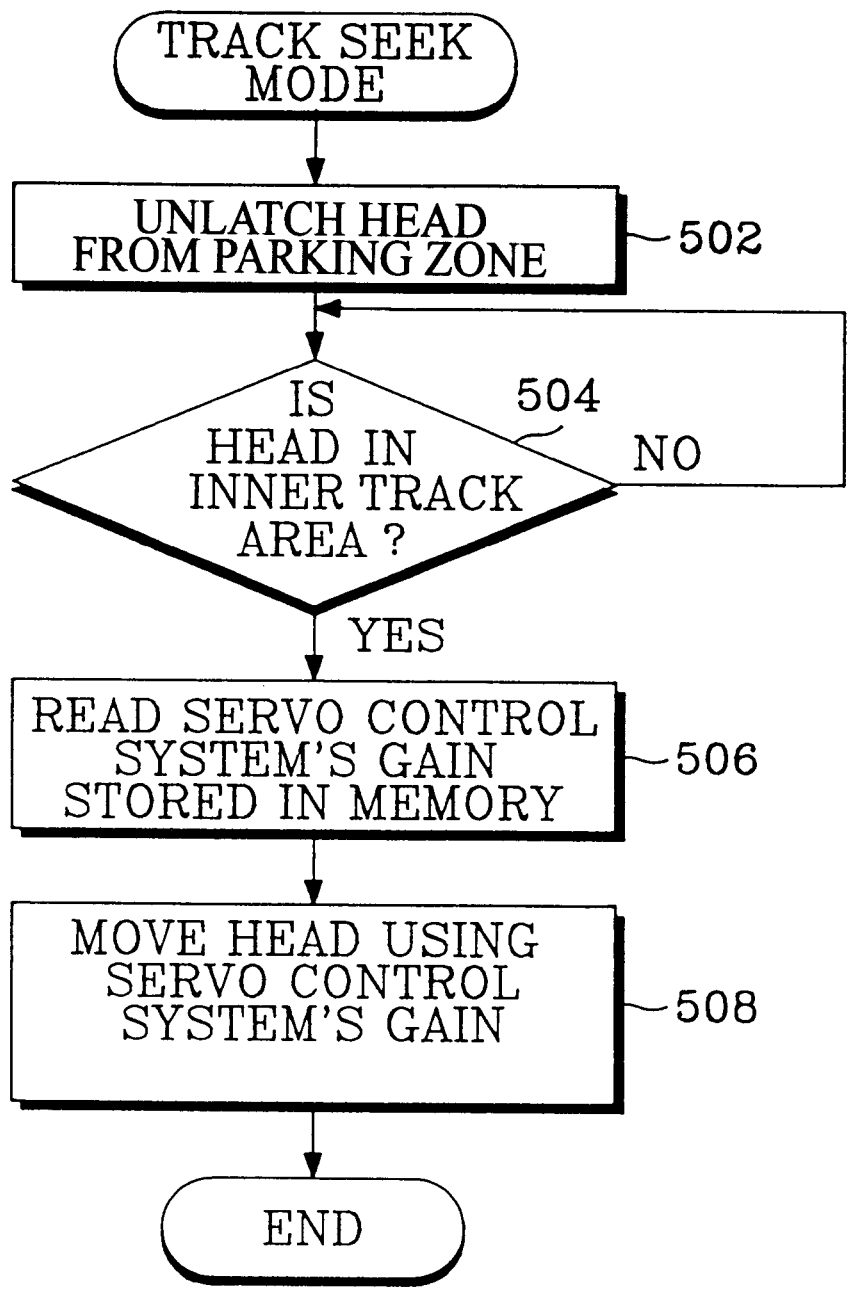
FIG. 5 is a flow chart of compensating for the non-linear torque characteristics of voice coil motor using the gain of the servo control system according to the principles of the present invention.

After calculating and storing the gains of the servo control system for each track area, the compensation which is performed when the head seeks tracks to read data from disk 110 during a track seek mode, is described with reference to FIG. 5 as follows.

Micro-controller 124 unlatches head 112 when it is located at a parking zone at step 502. Micro-controller 124 then detects if head 112 is located in the inner track area (step 504). If head 112 is in the inner track area, micro-controller 124 reads the gains of the servo control system stored in ROM 126 at step 506. Micro-controller 124 moves the head 112 according to the gains of the servo control system which are read from ROM 126.

As described above, at the stage of testing a hard disk drive, the present invention measures VCM torque constants at predetermined intervals and calculates, using the measured VCM torque constants, the gains of the servo system at each interval. After storing the calculated gains, the present invention provides a method of compensating for physical errors caused by the VCM during track seeking operations, using the corrected gains of servo system, thereby decreasing instability in the servo control system caused by nonlinear VCM characteristics and improving seeking performance, reliability, and audible noise characteristics of high performance disk drive.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of compensating for non-linear torque characteristics of an actuator servo control system in a disk drive, said method comprising the steps of:

initializing all variables in a memory, which are necessary to operate the actuator servo control system, when power is turned on;

unlatching a transducer head which is located in a parking zone;

measuring voice coil motor torque constants of each track area of a disk, starting from an inner track area to an outer track area, calculating gains of the actuator servo control system using the voice coil motor torque constants and storing the gains of the actuator servo control system in said memory; and compensating for non-linear torque characteristics of the actuator servo control system, based on the gains of the actuator servo control system of each track area of the disk which are stored in said memory, when the transducer head shifts from track to track to perform one of a read operation and a write operation.

2. The method of claim 1, further comprised of said disk including three differed track areas, including an inner track area, a center track area, and an outer track area.

3. The method of claim 2, further comprised of the voice coil motor torque constants of each track area are calculated using the following formula:

$$K_N = \frac{2 \times J \times \theta}{I \times T_N^2}$$

where "$K_N$" represents a torque constant of Nth track area, "J" represents the moment of inertia of an actuator, "θ" represents a seek distance, "I" represents an electrical current of a voice coil motor, and "T" represents the period of time for following one of track areas.

4. A method of compensating for non-linear torque characteristics of an actuator servo control system in a disk drive, said method comprising the steps of:

organizing a disk having a plurality of concentrically spaced data tracks in three different track areas including an inner track area, a center track area, and an outer track area;

moving a transducer head, during a gain correction mode, starting from an inner track toward an outer track to measure a time period taken to follow each of the inner track area, the center track area, and the outer track area and respective torque constant for each of the inner track area, the center track area, and the outer track area;

calculating gains of the actuator servo control system at each of the inner track area, the center track area, and the outer track area based on the torque constants and storing the gains of the actuator servo control system in a memory; and compensating for non-linear torque characteristics of the actuator servo control system, based on the gains of the actuator servo control system of each of the inner track area, the center track area, and the outer track area of the disk stored in said memory, when the transducer head shifts from track to track, during a track seek mode, to perform one of a read operation and a write operation.

5. The method of claim 4, further comprised of the torque constant of each of the inner track area, the center track area, and the inner track area is calculated using the following formula:

$$K_N = \frac{2 \times J \times \theta}{I \times T_N^2}$$

where "$K_N$" represents a torque constant of the respective track area, "J" represents the moment of inertia of an actuator, "θ" represents a seek distance, "I" represents an electrical current of a voice coil motor, and "T" represents the period of time for following one of inner, center and outer track areas.

6. A disk drive, comprising:
   a disk having a plurality of concentrically spaced data tracks organized in three different track areas including an inner track area, a center track area, and an outer track area;
   a voice coil motor;
   a servo control system for controlling movement of a transducer head, during a gain correction mode, starting from an inner track toward an outer track to measure a time period taken to follow each of the inner track area, the center track area, and the outer track area and respective torque constant of said voice coil motor for each of the inner track area, the center track area, and the outer track area, said servo control system further calculating gains at each of the inner track area, the center track area, and the outer track area based on the torque constants, storing the gains in a memory, and compensating for non-linear torque characteristics of the voice coil motor based on the gains of each of the inner track area, the center track area, and the outer track area of the disk stored in said memory, when the transducer head shifts from track to track, during a track seek mode, to perform one of a read operation and a write operation.

7. The disk drive of claim 6, further comprised of the torque constant of each of the inner track area, the center track area, and the inner track area is calculated using the following formula:

$$K_N = \frac{2 \times J \times \theta}{I \times T_N^2}$$

where "$K_N$" represents a torque constant of the respective track area, "J" represents the moment of inertia of an actuator, "θ" represents a seek distance, "I" represents an electrical current of a voice coil motor, and "T" represents the period of time for following one of inner, center and track areas.

* * * * *